United States Patent
Qiu (10) Patent No.: US 7,136,439 B2
(45) Date of Patent: Nov. 14, 2006

(54) ADAPTIVE SYNCHRONIZATION

(75) Inventor: Sigang Qiu, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 830 days.

(21) Appl. No.: 10/326,729

(22) Filed: Dec. 20, 2002

(65) Prior Publication Data

US 2004/0120436 A1    Jun. 24, 2004

(51) Int. Cl.
*H04L 7/00* (2006.01)
(52) U.S. Cl. .................................. 375/354
(58) Field of Classification Search ........ 375/354–356, 375/362, 365–367; 370/503, 512, 513, 514
See application file for complete search history.

(56) References Cited

U.S. PATENT DOCUMENTS

| | | | | |
|---|---|---|---|---|
| 5,892,803 | A * | 4/1999 | Saunders et al. | 375/355 |
| 6,363,131 | B1 * | 3/2002 | Beidas et al. | 375/368 |
| 6,680,968 | B1 * | 1/2004 | Black et al. | 375/149 |
| 6,985,549 | B1 * | 1/2006 | Biracree et al. | 375/355 |
| 2004/0081205 | A1 * | 4/2004 | Coulson | 370/503 |

\* cited by examiner

*Primary Examiner*—Khanh Tran
(74) *Attorney, Agent, or Firm*—Buckley, Maschoff & Talwalkar LLC (57) ABSTRACT

A method, apparatus, and system for adaptively synchronizing a sampling clock.

27 Claims, 3 Drawing Sheets

Method of Correcting Sample Offset

ADAPTIVE SYNCHRONIZATION

BACKGROUND OF THE INVENTION

In certain computer networks including, for example, the Internet, nodes communicate by way of modulated and demodulated asynchronous signals. Those asynchronous signals may be transmitted and received by, for example, modems or broadband communications such as Digital Subscriber Line ("DSL") transceivers. Those transceivers may furthermore operate under one or more common protocols such as, for example, Transmission Control Protocol and Internet Protocol ("TCP/IP"). Transceivers communicating by way of common protocols may exchange capabilities and select a common mode of operation. Such an exchange of capabilities and a selection of a common mode of operation are sometimes referred to as a "handshake." That handshake may be accomplished by way of a mechanism such as International Telecommunication Union Standard G.994.1 for DSL communication, for example.

Synchronization of information transmitted between transceivers is a requirement in communication systems, including DSL transceivers. Timing offset is furthermore a factor in synchronization due, for example, to imperfections in hardware. Moreover, calculation of timing offset may be computationally demanding. System overhead is required to accomplish such synchronization computation, taking system capacity from other functions. Thus, there is a need for a system, an apparatus, and a method that efficiently calculates timing offset. There is also a need for a system, an apparatus, and a method that synchronizes signals applying that calculated timing offset.

BRIEF DESCRIPTION OF THE DRAWINGS

The subject matter regarded as embodiments of the invention is particularly pointed out and distinctly claimed in the concluding portion of the specification. Embodiments, however, both as to organization and method of operation, together with objects, features, and advantages thereof, may best be understood by reference to the following detailed description wherein like reference numerals are employed to designate like parts or steps, when read with the accompanying drawings in which:

DETAILED DESCRIPTION OF THE INVENTION

Reference will now be made in detail to the preferred embodiments of the present invention, examples of which are illustrated in the accompanying drawings. It is to be understood that the Figures and descriptions of embodiments of the present invention included herein illustrate and describe elements that are of particular relevance, while eliminating, for purposes of clarity, other elements found in typical computers and computer networks.

The offset determination and clock synchronization techniques described herein provide solutions to the shortcomings of certain communication systems. Those of ordinary skill in communication system technology will readily appreciate that the offset determination and clock synchronization techniques, while described in connection with DSL communication, are equally applicable to other communication systems. Other details, features, and advantages of the offset determination and clock synchronization techniques will become further apparent in the following detailed description of the embodiments.

Any reference in the specification to "one embodiment," "a certain embodiment," or a similar reference to an embodiment is intended to indicate that a particular feature, structure, or characteristic described in connection with the embodiment is included in at least one embodiment of the invention. The appearances of such terms in various places in the specification are not necessarily all referring to the same embodiment. References to "or" are furthermore intended as inclusive so "or" may indicate one or the other ored terms or more than one ored term.

The Internet is a network of nodes such as computers, dumb terminals, or other typically processor-based, devices interconnected by one or more forms of communication media. Typical interconnected devices range from handheld computers and notebook PCs to high-end mainframe and supercomputers. The communication media coupling those devices include twisted pair, co-axial cable, optical fibers and wireless communication techniques such as use of radio frequency.

A node is any device coupled to the network including, for example, routers, switches, servers, and clients. Nodes may be equipped with hardware, software or firmware used to communicate information over the network in accordance with one or more protocols. A protocol may comprise a set of instructions by which the information signals are communicated over a communications medium. Protocols are, furthermore, often layered over one another to form something called a "protocol stack."

In one embodiment, for example, the network nodes operate in accordance with a seven layer Open Systems Interconnect ("OSI") architecture. The OSI architecture includes (1) a physical layer, (2) a data link layer, (3) a network layer, (4) a transport layer, (5) a session layer, (6) a presentation layer, and (7) an application layer. The physical layer is concerned with electrical and mechanical connections to the network and may, for example, be performed by a token ring or bus. The data link layer arranges data into frames to be sent on the physical layer and may receive frames. The data link layer may receive acknowledgement frames, perform error checking and re-transmit frames not correctly received.

The network layer determines routing of packets of data and may be performed by, for example, Internet Protocol (IP) as defined by IETF standard 5, RFC 791 (IP Specification), adopted in September, 1981 and available from www.ietf.org. The transport layer establishes and dissolves connections between nodes. The transport layer function is commonly performed by a packet switching protocol referred to as the Transmission Control Protocol (TCP). TCP is defined by the Internet engineering Task Force (IETF) standard 7, Request for Comment (RFC) 793, adopted in September, 1981 (TCP Specification). The network and transport layers are often referred to collectively as "TCP/IP."

The session layer establishes a connection between processes on different nodes and handles security and creation of the session. The presentation layer performs functions such as data compression and format conversion to facilitate systems operating in different nodes. The application layer is concerned with a user view of network data, for example, formatting electronic messages.

A packet is a unit of data to be transported, includes a source node address and a destination node address, and typically exists at the network layer or above. A frame includes a packet and a header and, possibly a trailer or other information, and typically exists at the data link layer. Packet size may be determined at the transport layer and frame size determined at the data link layer. Data that is larger than may be contained in a single packet may be split into multiple packets and frames. The maximum and minimum sizes of those frames that make up, for example one complete transmission data set, may then be determined.

Nodes may operate as source nodes, destination nodes, intermediate nodes or a combination of those source nodes, destination nodes, and intermediate nodes. Information is passed from source nodes to destination nodes, often through one or more intermediate nodes. Information may comprise any data capable of being represented as a signal, such as an electrical signal, optical signal, acoustical signal and so forth. Examples of information in this context may include data to be utilized by the node in which the data resides, data to be transferred to another node and utilized therein, and so forth.

Embodiments of the present invention may be applied to nodes communicating by way of communications mediums such as, for example, modems or broadband communication mediums. Certain examples provided herein describe embodiments wherein nodes communicate by way of DSL as an example. In communications, the term "baud" is used to represent unique line conditions. Each unique line condition is referred to as a symbol. In certain systems, one bit is sent in conjunction with each symbol, while in other systems multiple bits are sent in conjunction with each symbol. For example, Quadrature Amplitude Modulation ("QAM") may utilize phase shifts and amplitude to permit the transmission of a number of bits per symbol. A plurality of samples are transmitted and received to create or read a signal that represents each symbol. Embodiments of the present invention may be applied to either single or multiple bit transmissions per symbol. Bit transmission is typically expressed in bps, or bits per second.

Communication over a communication media may be performed synchronously or asynchronously. In asynchronous communication, information, such as a character, sent from one node to another is separated from other information by a start bit and a stop bit. Those start and stop bits may, for example, let a receiving node know that it is receiving a character. No external timing signal is typically necessary in such asynchronous communication, but the use of a great deal of start and stop bit overhead makes asynchronous communication inefficient. Synchronous communication utilizes timing signals to control transmission of frames containing blocks of information. Synchronization information is typically used to begin a transmission of a frame and to check the accuracy of the transmission. In embodiments of the present clock synchronization techniques, HDLC flags may be utilized as starting and ending octets for every frame.

A synchronizing device may include an analog front end ("AFE") that may be used to transmit data synchronously across an analog medium, may receive such data, and may be used for clock correction. The AFE may include an analog front end clock ("AFE clock"). The AFE may also include a digital to analog converter ("DAC") and a transmit circuit for converting digital data and transmitting that data across an analog medium to another node. The AFE may furthermore include an analog to digital converter ("ADC") and a receive circuit for receiving and converting data from another node.

In an embodiment of the present synchronization device, an AFE may provide a sampling frequency of 4.416 MHz plus or minus a maximum permissible error. That error may furthermore be expressed in units of parts per million ("ppm").

Figure 1:
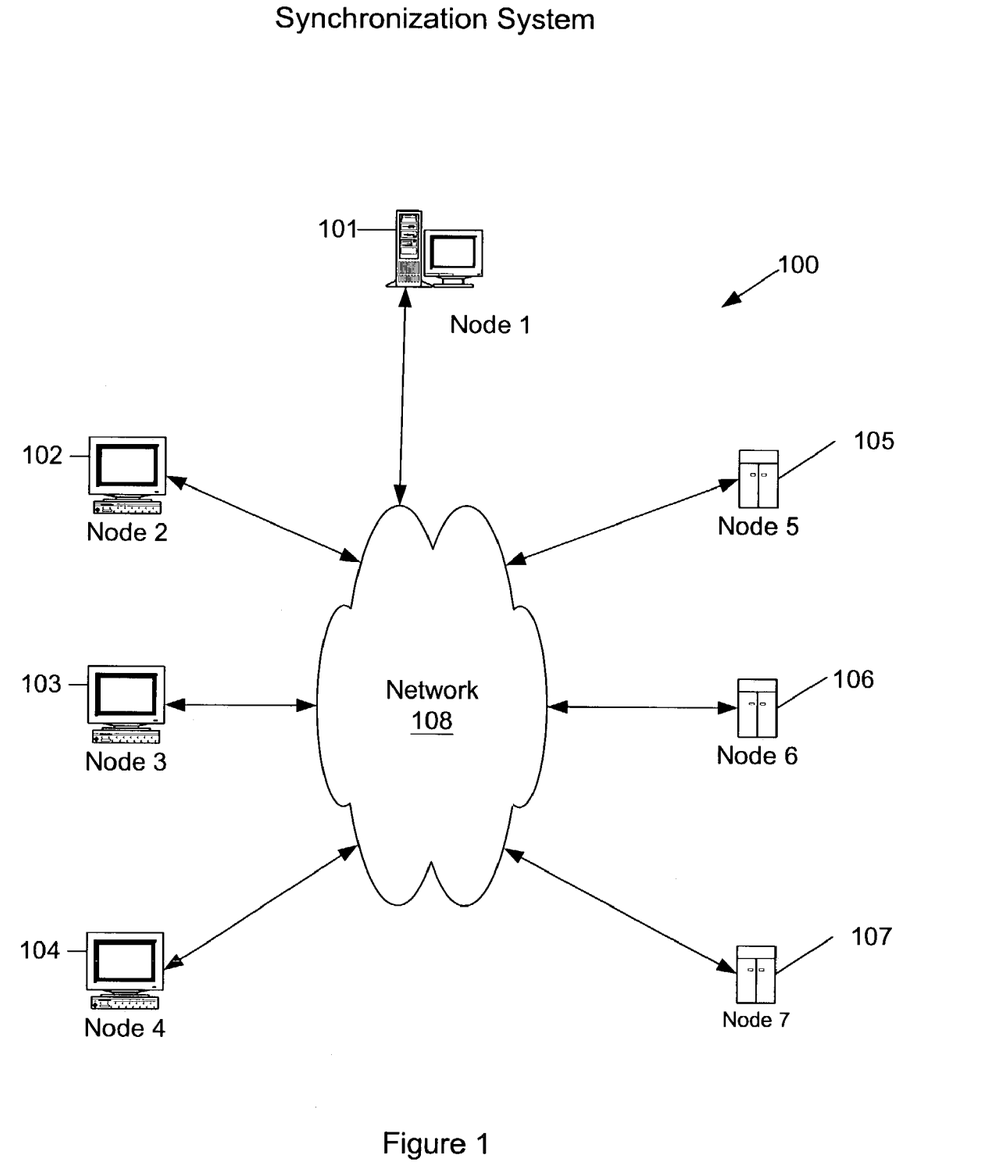
FIG. 1 is a block diagram of a system suitable for practicing an embodiment of the invention.

FIG. 1 illustrates a system 100 in which embodiments of the present invention may be implemented. Node 1 101 may be a network server. Node 2 102, node 3 103, and node 4 104 may be general purpose computers or client processors. Node 5 105, node 6 106, and node 7 107 may be network routers or switches. Any of those nodes 101–107 may include an implementation of an embodiment of the offset determination and clock synchronization techniques. The nodes 101–107 illustrated in FIG. 1 are coupled to a network 108 and may communicate therewith. Internodal communication may be achieved utilizing DSL or another communication medium.

Figure 2:
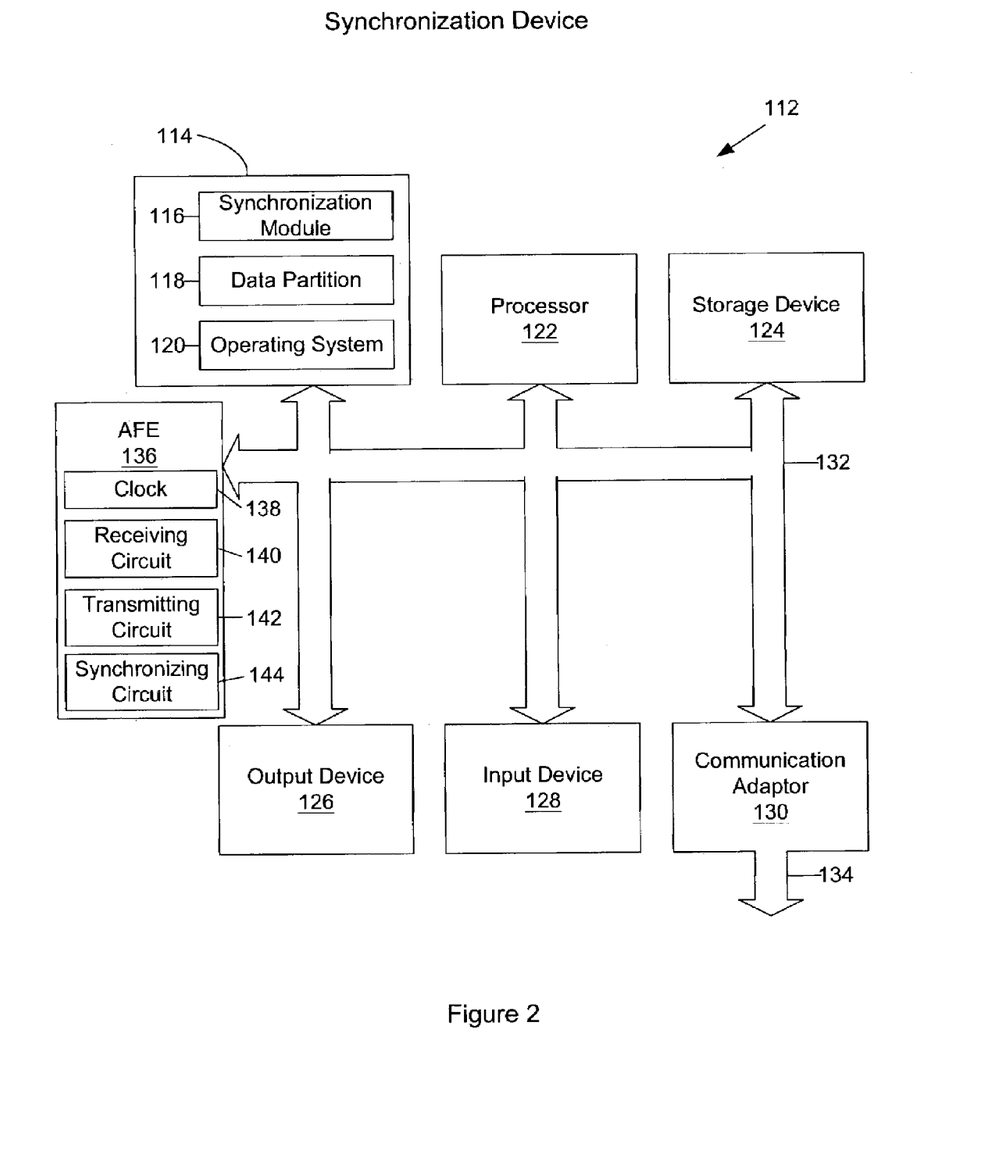
FIG. 2 is a block diagram of a device suitable for practicing an embodiment of the invention.

FIG. 2 illustrates a synchronization device 112 in an embodiment in which latency minimization is performed in a node. That synchronization device 112 includes memory 114, a processor 122, a storage device 124, an output device 126, an input device 128, a communication adaptor 130, and an analog front end 136. Communication between the processor 122, the storage device 124, the output device 126, the input device 128, and the communication adaptor 130 may be accomplished by way of one or more communication busses 132. It should be recognized that the synchronization device 112 may have fewer components or more components than shown in FIG. 2. For example, if a user interface is not desired, the input device 128 or output device 126 may not be included with the synchronization device 112.

The memory 114 may, for example, include random access memory (RAM), dynamic RAM, and/or read only memory (ROM) (e.g., programmable ROM, erasable programmable ROM, or electronically erasable programmable ROM) and may store computer program instructions and information. The memory 114 may furthermore be partitioned into sections in which operating system 120 instructions are stored, a data partition 118 in which data is stored, and a synchronization module 116 partition in which instructions for synchronization of communication may be stored. The synchronization module 116 partition may also allow execution by the processor 122 of the program instructions to synchronize one or more nodes 101–107. The data partition 118 may furthermore store data to be used during the execution of the program instructions such as, for example, offset calculations.

The processor 122 may, for example, be an Intel® Pentium® type processor or another processor manufactured by, for example Motorola®, Compaq®, AMD®, or Sun Microsystems®. The processor 122 may furthermore execute the program instructions and process the data stored in the memory 114. In one embodiment, the instructions are stored in memory 114 in a compressed and/or encrypted format. As used herein the phrase, "executed by a processor" is intended to encompass instructions stored in a compressed and/or encrypted format, as well as instructions that may be compiled or installed by an installer before being executed by the processor.

The storage device 124 may, for example, be a magnetic disk (e.g., floppy disk and hard drive), optical disk (e.g., CD-ROM) or any other device or signal that can store digital information. The communication adaptor 130 may permit communication between the synchronization device 112 and other devices or nodes coupled to the communication adaptor 130 at the communication adaptor port 134. The communication adaptor 130 may be a DSL or other type of network interface that transfers information from nodes on a network to the synchronization device 112 or from the synchronization device 112 to nodes on the network. The network may be a local or wide area network, such as, for example, the Internet, the World Wide Web, or the synchronization system 100 illustrated in FIG. 1. It will be recognized that the synchronization device 112 may alternately or in addition be coupled directly to one or more other devices through one or more input/output adaptors (not shown).

The synchronization device 112 may also be coupled to one or more output devices 126 such as, for example, a monitor or printer, and one or more input devices 128 such as, for example, a keyboard or mouse. It will be recognized, however, that the synchronization device 112 does not necessarily need to have an input device 128 or an output device 126 to operate. Moreover, the storage device 124 may also not be necessary for operation of the synchronization device 112.

The analog front 136 end may include a clock 138, a receive circuit 140, a transmit circuit 142, and a synchronization circuit 144.

The elements 114, 122, 124, 126, 128, and 130 of the synchronization device 112 may communicate by way of one or more communication busses 132. Those busses 132 may include, for example, a system bus, a peripheral component interface bus, and an industry standard architecture bus.

Figure 3:
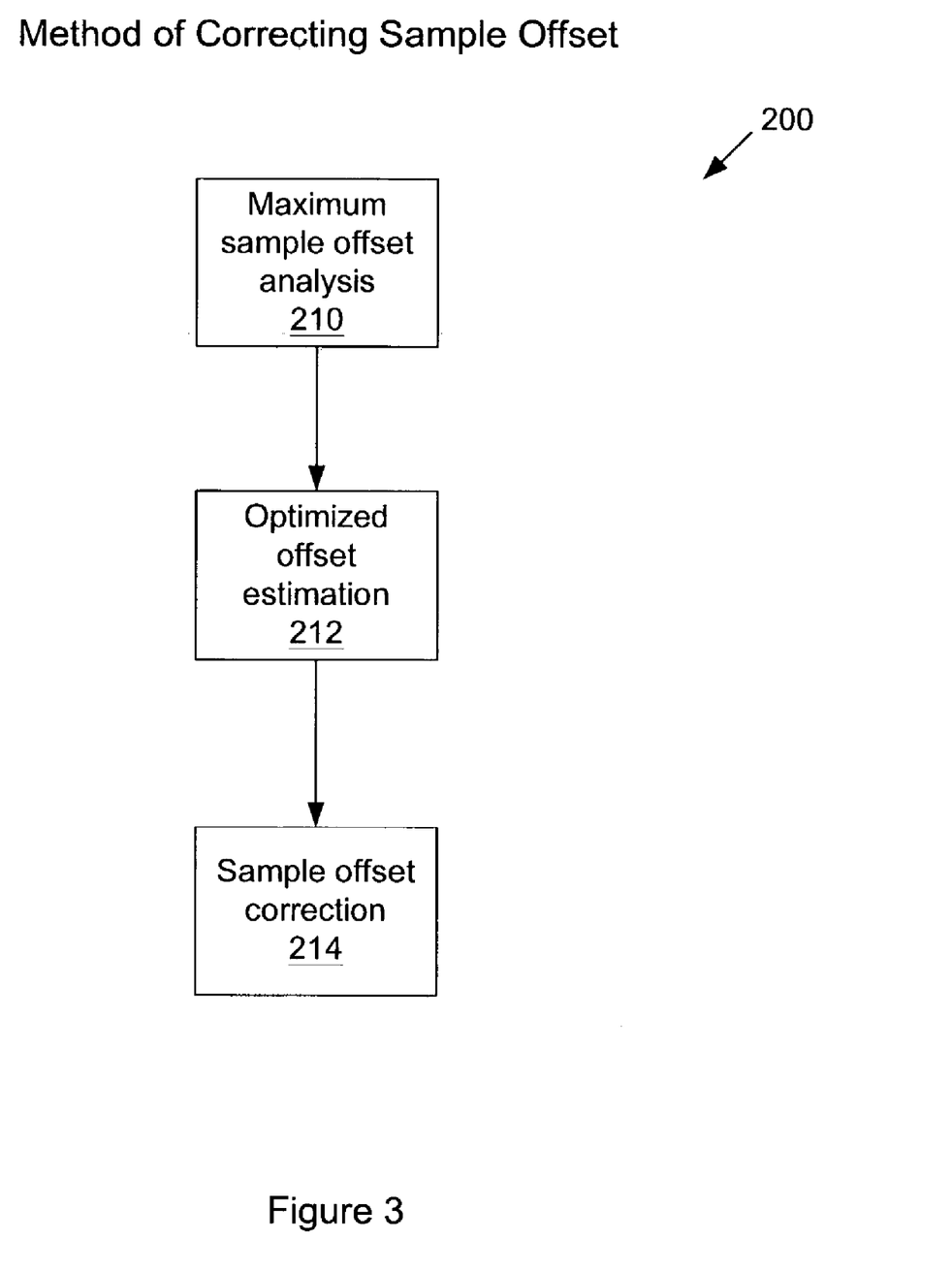
FIG. 3 is a flowchart depicting a signal synchronization method.

FIG. 3 illustrates a method of correcting sample offset 200. The method includes analysis of the maximum sample offset 210, optimized sample offset estimation 212, and sample offset correction 214. Maximum sample offset analysis 210 begins by determining the maximum number of sample offsets that can exist for a given AFE. That maximum number of sample offsets may be determined, for example, on the basis of a number of symbols that would normally be transmitted before a single sample slip would occur. That maximum sample offset may furthermore be predetermined prior to system operation.

Analysis of the maximum sample offset 210 may be computed in terms of a number of symbols that should be communicated before a single sample slip would occur. That possible number of symbols to be considered in Equation 2 may be calculated utilizing, for example, Equation 1 below or data from tables such as Table 1 and Table 2 below. The symbol period per sample slip illustrated in column 3 of Tables 1 and 2 and resulting from Equation 1 indicate the number of symbols that should be communicated before a single sample offset would occur, and thus a symbol period duration that should pass before it is necessary to repeat the offset calculation and symbol synchronization. Thus, for example as illustrated in Table 1, it should take at least 2.4415 symbols to experience a possible slip of a single sample for carrier sets A43, B43, and C43 with a sampling frequency of 4416 kHz. Since no sample slip should be experienced in one symbol period, but rather only after 2.4415 symbols, it makes sense to check for timing offset during a time period less than or equal to that symbol period; for example every one symbol period or two symbol periods. Furthermore, only three sample slip states should exist after that two symbol period; either a sample slip has occurred in a negative direction (k=−1) no sample slip has occurred (k=0), or a sample has slipped in a positive direction (k=1). Thus those three conditions may be tested by the optimized sample offset estimation 212.

Optimized sample offset estimation 212 involves calculation of a sample offset using a subset of the total number of samples occurring. That subset may be equal to the number of symbols that should pass before a sample slip would occur times the number of samples per symbol. If two symbol periods are to be tested, then a group of 1024 samples might, for example, be included in the subset. A determination of whether a sample offset has occurred may then be made by applying Equation 2 to the group of samples.

Equation 2 utilizes a large number of samples to determine optimal synchronization offset while minimizing computational requirements, and so provides optimal sample offset correction 214. That optimal sample offset correction 214 is further optimized because the calculations may be performed repeatedly on new data as it is received, thus permitting the optimal offset correction 214 to be adaptive to changes in system performance.

The synchronization offset determined from Equation 2 may then be utilized to synchronize the system by making a clock timing correction.

It is the nature of communications systems that sample offset typically accumulates as time passes during a transmission. There is typically no offset at the commencement of a transmission, but sample offset may occur during the transmission because, for example, of imperfect AFE clocks or other hardware. Thus, offset may be measured from a benchmark to a current symbol. That may be accomplished, for example, by measuring offset from one symbol period to a next symbol period and synchronizing the system accordingly. Alternately, offset may be measured over a number of symbols. Yet another benchmark for measuring offset might be a synchronization flag, such as an HDLC flag or a comparable flag having a known value or sequence of values in a communication system other than DSL, that occurs at the beginning of the transmission of a data frame. A zero offset could be assumed each time a synchronization flag is received or transmitted and every offset calculation occurring during the frame could be compared to the synchronization flag to give an updated offset. The following examples utilize offset comparison between adjacent symbols.

Embodiments that perform the sample offset correction technique provide optimum and efficient synchronized communication. Tables 1 and 2 illustrate phase and sample offset estimates for G.994.1 standard carrier sets.

TABLE 1

G.994.1 - phase and sample offset estimates
(Fs = 4416 kHz ± 50 ppm)

| Carrier Set (in kHz) | Phase offsets (in radians) per symbol period | Symbol period per sample slip |
|---|---|---|
| A43: [40, 56, 64] * 4.3125 | [0.10053, 0.14074, 0.16084] | 2.4415 |
| B43: [72, 88, 96] * 4.3125 | [.180947, 0.22116, 0.24126] | 2.4415 |
| C43: [12, 14, 64] * 4.3125 | [0.03016, 0.03518, 0.16084] | 2.4415 |
| A4: 5 * 4 | 0.00785 | 3.6234 |

Table 1 illustrates estimated phase and sample offsets for standard G.994.1 utilizing a maximum window size ("$L_W$")

of 1024 samples. The AFE sampling frequency is 4416 kHz and the actual sampling frequency normally operates at 4416 kHz±50 ppm.

TABLE 2

G.994.1 - phase and sample offset estimates
(Fs = 2208 kHz ± 50 ppm)

| Carrier Set (in kHz) | Phase offsets (in radians) per symbol period | Symbol period per sample slip |
|---|---|---|
| A43: [40, 56, 64] * 4.3125 | [0.10053, 0.14074, 0.16084] | 4.8831 |
| B43: [72, 88, 96] * 4.3125 | [.180947, 0.22116, 0.24126] | 4.8831 |
| C43: [12, 14, 64] * 4.3125 | [0.03016, 0.03518, 0.16084] | 4.8831 |
| A4: 5 * 4 | 0.00785 | 7.2467 |

Table 2 illustrates estimated phase and sample offsets for standard G.994.1 utilizing a maximum window size ("$L_W$") of 512 samples. The AFE sampling frequency is 2208 kHz and the actual sampling frequency normally operates at 4416 kHz±50 ppm.

The first column of each of Tables 1 and 2 indicates carrier sets in kHz. A carrier set is one or more frequencies capable of being modified to carry information by, for example, amplitude modulation, frequency modulation, or phase modulation. Amplitude is the signal strength, or signal power, and is the relative "height" of the wave. Frequency is the rate at which an electromagnetic waveform alternates as is usually measured in Hertz (cycles per second) and equals the number of complete cycles occurring in one second. Phase is the relationship between a signal and its horizontal axis, also called the zero access point. A full signal cycle describes a 360° arc. Embodiments of the sample offset correction technique could be used in frequency modulation and other modulation based techniques.

The carrier set in DSL, for example, allows 1 bit stream to be carried on a multi-tone signal. Carrier set A43, for example, specifies three downstream frequencies of 40 times 4.3125 kHz, 56 times 4.3125 kHz, and 64 times 4.3125 kHz creating a multi-tone signal. Those tones combine to send a signal. Information, typically in the form of bits of data, are transmitted by changing some feature of the signal (e.g., frequency, amplitude or phase of the signal), transmitting the signals by modulation from the transmitting node, and then changing the signal back by demodulation upon reception at the receiving node. Of course, similar carrier systems allow for multiple information channels to be carried by many other broadband systems as well.

The first column of Tables 1 and 2 indicates the current carrier sets for the 4.3125 kHz signalling family; A43, B43, and C43 and the current carrier set for the 4.0 kHz family; A4, with sampling frequency ("Fs") of 4416 kHz+/−50 parts per million for Table 1 and 2208 kHz+/−50 parts per million for Table 2.

The numbers in the brackets indicate downstream carriers used in each carrier set. For example, in the A43 carrier set, downstream carriers with carrier indices of 40, 56 and 64 are currently used. The frequency of each downstream carrier may be found by multiplying the downstream carrier by the signalling family frequency of which it is a part. Thus, communication on the A43 carrier set may be performed at frequencies of 40 times 4.3125 kHz, or 172.5 kHz; 56 times 4.3125 kHz, or 241.5 kHz; and 64 times 4.3125 kHz, and 276.0 kHz. Upstream carrier frequencies may be specified in each carrier set.

The A43, B43, and C43 carrier sets are used principally with ADSL in different parts of the world, with A43 used primarily in North America, B43 used primarily in Europe, and C43 used primarily in Japan. The A4 carrier set is a member of the 4 kHz signalling family that uses a single upstream carrier and single downstream carrier. A4 carrier set is used primarily with symmetric DSL modem types.

The second column of Tables 1 and 2 indicates the maximum phase offset per symbol period for the listed carrier sets, in radians. Each of the series of numbers applies to the associated downstream carriers. Thus, for example, A43 downstream carrier 40 has a maximum phase offset per symbol of 0.10053 radians, A43 downstream carrier 56 has a maximum phase offset per symbol of 0.14074 radians, and A43 downstream carrier 64 has a maximum phase offset per symbol of 0.16084 radians.

The third column of Tables 1 and 2 indicates the symbol period per sample slip. The sample slip value indicates the minimum number of symbols that should occur before the transmission or reception will be off by one sample. Thus, for example, it should take at least 2.4415 symbols before a sample slip would occur utilizing carrier set A43 at a sampling frequency of 4416 kHz, as illustrated in Table 1.

In embodiments of the present clock synchronization techniques, a maximum number of sample offsets may be pre-calculated. That maximum number of sample offsets may be calculated on a per symbol or per multiple symbol basis, for example, and may be calculated repeatedly, for example, once for each symbol period. Where, for example, offsets vary significantly over a short period of time, the computational efficiency of the present offset determination and clock synchronization techniques permits the offset to be calculated more frequently than once per symbol or group of symbols. The calculation may be performed by first determining theoretically possible phase offsets for each symbol or group of symbols. The maximum possible offsets within a symbol period may be calculated by the equation:

$$\Delta\phi = \frac{2*\pi*F_c*N_{symbol\text{-}period}}{F_s+\Delta F_s} - \frac{2*\pi*F_c*N_{symbol\text{-}period}}{F_s} \quad \text{Equation 1}$$

where:

$\Delta\phi$ is the phase offset for a symbol period;

$F_C$ is the carrier frequency;

$F_S$ is the sampling frequency, for example 4416 kHz for Table 1;

$\Delta F_S$ is the difference in sampling frequencies between a sample in a symbol such as a current symbol and a corresponding sample in a benchmark symbol; and $N_{symbol\text{-}period}$ is the number of samples per symbol period. The symbol period, or time for a whole symbol to be transmitted, is defined as 8 divided by 4312.5 Hz or approximately 0.001855 seconds for carrier sets A43, B43, and C43. For example, if the sampling frequency ($F_S$) is 4416 kHz, then $N_{symbol\text{-}period}$ is 8 divided by the base carrier frequency of 4312.5 Hz times the sampling frequency of 4416000 Hz, or 8192 samples per symbol period. Thus, with a sampling frequency ($F_S$) of 4416 kHz as illustrated in Table 1, a number of samples per symbol period ($N_{symbol\text{-}period}$) of 8192 would be expected for A43, B43 and C43 carrier sets. If the sampling frequency ($F_S$) is 2208 kHz as illustrated in Table 2, then 2208000 Hz may be multiplied by 0.001855 seconds to arrive at a number of samples per symbol period ($N_{symbol\text{-}period}$) of 4096 samples per symbol period for A43, B43 and C43 carrier sets.

For carrier set A4 with a sampling frequency of 2208 kHz, as illustrated in Table 2, the symbol period is defined as 5 divided by the base carrier frequency of 4 kHz, or 0.0013 seconds. Multiplying the sampling frequency ($F_S$) of 2208 kHz by 0.0013 seconds provides a number of samples per symbol period ($N_{symbol-period}$) of 2760 samples per symbol period for carrier set A4, as illustrated in Table 2.

That equation may be altered to calculate phase offset for a group of symbols by replacing $N_{symbol-period}$ with $N_{symbol\ group-period}$, where $N_{symbol\ group-period}$ is the number of samples per the period of the group of symbols. The range of possible sample offsets may be greater when a group of symbols are utilized such that the range of k (See Equation 2 below) may be greater than a single sample offset in either the positive or negative direction.

Symbol timing-offset may be corrected by minimizing the mean squared error ("MSE") or maximizing the negative MSE. That may be accomplished by use of the following equation for $\hat{k}$:

$$\hat{k} = \underset{-L_W+1 \leq k \leq L_W-1}{\arg\max} \left\{ \left| \sum_{i=0}^{L_W-1} r(i) r^*(k+i+N) \right| - \frac{1}{2} \sum_{i=0}^{L_W-1} [|r(i)|^2 + |r(k+i+N)|^2] \right\} \quad \text{Equation 2}$$

wherein:

k is a sample offset index;

$\hat{k}$ is the sample offset index providing the largest value of the expression inside of { . . . } in Equation 2;

arg max indicates that the resulting $\hat{k}$ is equal to the k that provides the largest value of the expression inside of { . . . } in Equation 2;

$L_W$ is a window length;

$-L_W+1 \leq k \leq L_W-1$ indicates the range of k;

i increments by whole numbers from 0 to $L_W-1$;

r(i) is an offset of a symbol received at time i;

r*(k+i+N) is a complex conjugate of r(k+i+N): and

N may be predetermined and may be the number of samples per symbol period.

Embodiments of the present adaptive synchronization technique calculate maximum offset based on a given system and AFE utilizing a limited range of k. Because $\hat{k}$ is equal to the k that provides the largest value of the expression inside of { . . . } in Equation 2 and the symbol period per sample slip for Table 1 is 2.4415, Equation 2 need only be computed for 3 values of k; k=−1, k=0, and k=1 on a one or two symbol period basis. If the calculated value with k=−1 is the largest one among the three values, then $\hat{k}$=−1. If $\hat{k}$=−1, the clock is running too fast by one sample. Given that result, symbol timing should be adjusted back by one sample. If the calculated value with k=0 is the largest one among the three values, then $\hat{k}$=0 then symbol timing is within the permissible error range and symbol timing need not be adjusted. If the calculated value with k=1 is the largest one among the three values, then $\hat{k}$=1. Given that result, symbol timing should be adjusted forward by one sample.

A normal window length ($L_W$) might be 512 for a sampling frequency ($F_S$) of 2208 kHz and 1024 for a sampling frequency ($F_S$) of 4416 kHz. Those window sizes may be calculated by dividing the sampling frequency by the base carrier frequency such that 2208 kHz/4.3125 kHz=512 samples and 4416 kHz/4.3125 kHz=1024 samples. Embodiments of the present invention may operate more accurately with larger window sizes. Moreover, a number of samples per symbol period might be 8 times 1024 samples, or 8192 samples per symbol period when the sampling frequency ($F_S$) is 4416 kHz, and 8 times 512 samples, or 4096 samples per symbol period when the sampling frequency ($F_S$) is 2208 kHz.

The following example will be performed for a number of samples per symbol period ($N_{symbol-period}$) of 4096 and for a portion of a window having a length of 512 samples. For the sake of simplicity, only three of the 512 sample calculations will be illustrated. The example is provided to illustrate how the calculation of the summation of Equation 2 could be performed.

Initially, the left summation will be solved for i=0, 1, and 2 in accordance with the simplified window length provided for in this example, even though the left summation would actually be solved for i=0 to 511 in an embodiment wherein the window length is 512. Solving the left summation for i=0, r(i) would be equal to r(0) and r*(k+i+N) would be equal to r*(k+0+N). Solving the left summation for i=1, r(i) would be equal to r(1) and r*(k+i+N) would be equal to r*(k+1+N). Solving the left summation for i=2, r(i) would be equal to r(2) and r*(k+i+N) would be equal to (k+2+N). In an actual application, the left summation would also be solved for i=3, 4 . . . 511. Applying N=4096, the sum of the absolute values of those values would thus be |r(0)r*(k+4096)|+|r(1)r*(k+1+4096)|+|r(2)r*(k+2+4096)|+ . . . +|r(511)r*(k+511+4096)|.

Solving next for k=−1, the left summation would be |r(0)r*(4095)|+|r(1)r*(4096)|+|r(2)r*(4097)|+ . . . +|r(511)r*(4606)|.

Table 3 includes partial sample data from two consecutive windows. The first and third columns indicate sample indexes corresponding to sample values in adjacent windows. Thus at time instance 1 a sample value of 0.3681 is read by the AFE and at time instance 4096 a sample value of 0.4851 is read by the AFE. Time instances 1 and 4096, furthermore, are corresponding samples in adjacent symbols, wherein there are 4096 samples per symbol.

TABLE 3

| Sample Index | Sample Value | Sample Index | Sample Value |
|---|---|---|---|
| ... | ... | ... | ... |
| −1 | 0.6823 | 4094 | 0.3974 |
| 0 | 0.6248 | 4095 | 0.6709 |
| 1 | 0.3681 | 4096 | 0.4851 |
| 2 | 0.2028 | 4097 | 0.3826 |
| 3 | 0.2751 | 4098 | 0.5635 |
| 4 | 0.4815 | 4099 | 0.7793 |
| 5 | 0.4002 | 4100 | 0.6177 |
| ... | ... | ... | ... |

Applying the sample data from Table 3 to corresponding values in the left summation equation for k=−1, results in |0.6248(0.6709)|+|0.3681(0.4851)|+|0.2028(0.3826)|+ . . . to a term corresponding to i=511.

Solving next for k=0, the left summation would be |r(0)r*(0+0+4096)|+|r(1)r*(0+1+4096)|+|r(2)r*(0+2+4096)| + . . . +|r(511)r*(0+511+4096)|, which simplified is |r(0)r*(4096)|+|r(1)r*(4097)|+|r(2)r*(4098)|+ . . . +|r(511)r*(4607)|. Applying the sample data from Table 3 to corresponding values in the left summation equation for k=0, results in |0.6248(0.4851)|+|0.3681(0.3826)|+|0.2028(0.5635)|+ . . . to a term corresponding to i=511.

Solving next for k=1, the left summation would be |r(0)r*(1+0+4096)|+|r(1)r*(1+1+4096)|+|r(2)r*(1+2+4096)| + . . . +|r(511)r*(1+511+4096)|, which simplified is |r(0)r*(4097)|+|r(1)r*(4098)|+|r(2)r*(4099)|+ . . . +|r(511)r*(4608)|.

Applying the sample data from Table 3 to corresponding values in the left summation equation for k=0, results in |0.6248(0.3826)|+|0.3681(0.5635)|+|0.2028(0.7793)|+ . . . to a term corresponding to i=511.

Next, the right summation will be solved for i=0, 1, and 2 in accordance with the simplified window length provided for in this example. Solving the right summation for i=0, $|r(i)|^2$ would be equal to $|r(0)|^2$ and $|r*(k+i+N)|^2$ would be equal to $|r*(k+0+4096)|^2$. Solving the left summation for i=1, $|r(i)|^2$ would be equal to $|r(1)|^2$ and $|r*(k+i+N)|^2$ would be equal to $|r*(k+1+4096)|^2$. Solving the left summation for i=2, $|r(i)|^2$ would be equal to $|r(2)|^2$ and $|r*(k+i+N)|^2$ would be equal to $|r*(k+2+4096)|^2$. In an actual application, the left summation would also be solved for i=3, 4, . . . 511.

Solving for k=−1, the left summation would be one half of $((|r(0)|^2+|r*(-1+0+4096)|^2)+(|r(1)|^2+|r*(-1+1+4096)|^2)+(|r(2)|^2+|r*(-1+2+4096)|^2))+ \ldots +(|r(511)|^2+|r*(-1+511+4096)|^2))$, which simplified is ½ $((|r(0)|^2+|r*(4095)|^2)+(|r(1)|^2+|r*(4096)|^2)+(|r(2)|^2+|r*(4097)|^2)+ \ldots +(4096)|^2))$. Applying the sample data from Table 3 to corresponding values in the left summation equation for k=−1, results in ½ $((0.6248^2+0.6709^2)+(0.3681^2+0.4851^2)+(0.2028^2+0.3826^2)+ \ldots$ to a term corresponding to i=511), which is ½(0.3904+0.4500+0.1355+0.2353+0.0411+0.1464+ . . . to a term corresponding to i=511). The solution for k=−1 is, then, the left summation solution less one-half of the right summation solution.

Solving for k=0, the left summation would be one half of $((|r(0)|^2+|r*(0+0+4096)|^2)+(|r(1)|^2+|r*(0+1+4096)|^2)+(|r(2)|^2+|r*(0+2+4096)|^2)+ \ldots +(|r(511)|^2+|r*(0+511+4096)|^2))$, which simplified is ½$((|r(0)|^2+|r*(4096)|^2)+(|r(1)|^2+|r*(4097)|^2)+(|r(2)|^2+|r*(4098)|^2)+ \ldots +(|r(511)|^2+|r*(4607)|^2))$. Applying the sample data from Table 3 to corresponding values in the left summation equation for k=−1, results in ½$((0.6248^2+0.4851^2)+(0.3681^{2+0.38262})+(0.2028^{2+0.5635})+ \ldots$ to a term corresponding to i=511), which is ½(0.3904+0.2353+0.1355+0.1464+0.0411+0.3175+ . . . to a term corresponding to i=511). The solution for k=0 is, then, the left summation solution less one-half of the right summation solution.

Solving for k=1, the left summation would be one half of $((|r(0)|^2+|r*(1+0+4096)|^2)+(|r(1)|^2+|r*(1+1+4096)|^2)+(|r(2)|^2+|r*(1+2+4096)|^2)+ \ldots +(|r(511)|^2+|r*(0+511+4096)|^2))$, which simplified is ½$((|r(0)|^2+|r*(4097)|^2)+(|r(1)|^2+|r*(4098)|^2)+(|r(2)|^2+|r*(4099)|^2)+ \ldots +(|r(511)|^2+|r*(4097)|^2))$. Applying the sample data from Table 3 to corresponding values in the left summation equation for k=0, results in ½$((0.6248^2+0.3826^2)+(0.3681^2+0.5635)+(0.2028^2+0.7793)+ \ldots$ to a term corresponding to i=511), which is ½(0.3904+0.1464+0.1355+0.3175+0.0411+0.6073+ . . . to a term corresponding to i=511). The solution for k=1 is, then, the left summation solution less one-half of the right summation solution.

$\hat{k}$ is then equal to the index corresponding to the largest resulting value.

Computationally, Equation 2 requires four times $L_W^2$ multiplications. Embodiments of the present offset determination and clock synchronization techniques, however, need only be computed for k=−1, k=0, and k=1, thereby reducing the computational requirements by an order of $L_W$. Furthermore, the present offset determination and clock synchronization techniques permit maximization of the window size by minimizing the complexity of calculating offset. That results in accurate synchronization and stable communication performance.

In an embodiment, a method of clock synchronization is contemplated. That method includes determining a minimum period during which a timing offset equal to one sample period could occur, selecting a range of sample offset based on that minimum period, determining which sample offset from the selected range results in a largest negative MSE value, and synchronizing information receipt based on the sample offset having the largest negative MSE.

A synchronization device is also contemplated. The synchronization device includes a clock, a receiving and/or transmitting circuit, and a synchronizing circuit. The synchronizing circuit in that embodiment determines a minimum period during which a timing offset equal to one sample period could occur, selects a sample offset range incident at the receiving and/or transmitting circuit based on that minimum period, and synchronizes the clock based on the sample offset maximizing the negative MSE.

An article of manufacture is also contemplated. That article of manufacture includes a computer readable medium having stored thereon instructions. When the instructions are executed by the processor, the processor determines a minimum period during which a timing offset equal to one sample period could occur, selects a sample offset range based on that minimum period, determines which sample offset from the selected range results in a largest negative mean squared error, and synchronizes communication of information based on the sample offset having the largest negative mean squared error.

While the present offset determination and clock synchronization systems, apparatuses, and methods have been described in detail and with reference to specific embodiments thereof, it will be apparent to one skilled in the art that various changes and modifications can be made therein without departing from the spirit and scope thereof. For example, the present offset determination and clock synchronization systems, apparatuses, and methods may be applied to communication mediums other than DSL. Thus, it is intended that the present invention cover the modifications and variations of this invention provided they come within the scope of the appended claims and their equivalents.

What is claimed is:

1. A synchronization method, comprising:
   determining a minimum period during which a timing offset equal to one sample period could occur;
   selecting a sample offset range based on that minimum period;
   determining which sample offset from the selected range results in a largest negative mean squared error; and
   synchronizing communication of information based on the sample offset having the largest negative mean squared error.

2. The method of claim 1, wherein selecting a range of sample offset based on the minimum period includes selecting a number of samples that would be received within that minimum period.

3. The method of claim 1, wherein selecting a sample offset range based on the minimum period includes selecting a number of samples contained in a whole number of symbol periods that would be received within that minimum period.

4. The method of claim 1, further comprising offsetting the communication of information by one sample back in time if the negative mean squared error yields the largest value with a sample offset value of negative one.

5. The method of claim 1, further comprising not offsetting the communication of information if the negative mean squared error yields the largest value with a sample offset value of zero.

6. The method of claim 1, further comprising offsetting the communication of information by one sample forward in time if the negative mean squared error yields the largest value with a sample offset value of positive one.

7. The method of claim 2, wherein a previous time period includes a synchronization flag.

8. The method of claim 1, wherein synchronizing the communication of information includes synchronizing a clock controlling receipt of digital information.

9. The method of claim 1, wherein synchronizing the communication of information includes synchronizing a clock controlling transmission of digital information.

10. The method of claim 1, wherein the minimum period during which a timing offset equal to one sample period could occur is predetermined based on a communication system utilized.

11. The method of claim 10, wherein the minimum period is based on a carrier frequency of the communication system, a sampling frequency of the communication system, and a number of samples per symbol period.

12. The method of claim 1, wherein the information synchronized includes a symbol.

13. The method of claim 1, wherein the information synchronized includes a frame.

14. The method of claim 1, wherein the information is transmitted on an analog communication medium.

15. The method of claim 1, wherein the information is transmitted on a digital communication medium.

16. The method of claim 1, wherein the information is transmitted on a digital subscriber line.

17. A synchronization device, comprising:
an analog front end having:
a clock;
a receiving circuit; and
a synchronizing circuit that
determines a minimum period during which a timing offset equal to one sample period could occur;
selects a sample offset range incident at the receiving circuit based on that minimum period;
determines which sample offset from the selected range of sample offsets results in a largest negative mean squared error; and
synchronizes the clock based on the sample offset maximizing the negative mean squared error.

18. The synchronization device of claim 17, wherein the sample offset range includes a number of samples contained in a whole number of symbol periods that would be received within that minimum period.

19. The synchronization device of claim 17, wherein the clock is an analog front end clock synchronizing transmission of information.

20. The synchronization device of claim 17, wherein the clock is an analog front end clock synchronizing reception of information.

21. An article of manufacture comprising:
a computer readable medium having stored thereon instructions which, when executed by a processor, cause the processor to:
determine a minimum period during which a timing offset equal to one sample period could occur;
select a sample offset range based on that minimum period;
determine which sample offset from the selected range results in a largest negative mean squared error; and
synchronize communication of information based on the sample offset having the largest negative mean squared error.

22. The article of manufacture of claim 21, wherein the sample offset range includes a group of sample offsets contained in a whole number of symbol periods that would be received in the minimum period.

23. The article of manufacture of claim 21, wherein the sample offset range includes a group of sample offsets contained in a whole number of symbol periods that would be transmitted in the minimum period.

24. A synchronization device, comprising:
an analog front end having:
a clock;
a transmitting circuit; and
a synchronizing circuit that
determines a minimum period during which a timing offset equal to one sample period could occur;
selects a sample offset range incident at the transmitting circuit based on that minimum period;
determines which sample offset from the selected range of sample offsets results in a largest negative mean squared error; and
synchronizes the clock based on the sample offset maximizing the negative mean squared error.

25. The synchronization device of claim 24, wherein the sample offset range includes a number of samples contained in a whole number of symbol periods that would be transmitted within that minimum period.

26. The synchronization device of claim 24, wherein the clock is an analog front end clock synchronizing transmission of information.

27. The synchronization device of claim 24, wherein the clock is an analog front end clock synchronizing reception of information.

* * * * *